United States Patent
Swann et al.

(10) Patent No.: US 9,449,288 B2
(45) Date of Patent: Sep. 20, 2016

(54) TRAVEL SERVICES SEARCH

(75) Inventors: Garner Swann, Redwood City, CA (US); Parthasarathy Sundaram, Bellevue, WA (US); Jeremy Paul Todd, Los Gatos, CA (US); Rajat Shroff, Redwood Shores, CA (US); Alan Todd Kaiser, San Jose, CA (US); Nicholas Briggs, Sunnyvale, CA (US); David Falk, Castro Valley, CA (US); Daniel L. Pritchett, San Jose, CA (US)

(73) Assignee: Deem, Inc., San Francisco, CA (US)

( * ) Notice: Subject to any disclaimer, the term of this patent is extended or adjusted under 35 U.S.C. 154(b) by 200 days.

(21) Appl. No.: 13/476,900

(22) Filed: May 21, 2012

(65) Prior Publication Data

US 2013/0041902 A1 Feb. 14, 2013

Related U.S. Application Data

(60) Provisional application No. 61/488,567, filed on May 20, 2011.

(51) Int. Cl.
*G06F 17/30* (2006.01)
*G06Q 10/02* (2012.01)

(52) U.S. Cl.
CPC ........... *G06Q 10/02* (2013.01); *G06F 17/3071* (2013.01); *G06F 17/30864* (2013.01)

(58) Field of Classification Search
CPC .............. G06Q 30/0603; G06Q 50/14; G06F 17/3071; G06F 17/30864
USPC ......... 707/706, 707, 737, 804, 805; 705/5, 6
See application file for complete search history.

(56) References Cited

U.S. PATENT DOCUMENTS

| | | | |
|---|---|---|---|
| 4,812,843 A | 3/1989 | Champion et al. | |
| 4,969,136 A | 11/1990 | Chamberlin et al. | |
| 5,021,953 A * | 6/1991 | Webber et al. | 705/6 |
| 5,237,499 A | 8/1993 | Garback | |
| 5,289,531 A | 2/1994 | Levine | |
| 5,331,546 A * | 7/1994 | Webber et al. | 705/6 |
| 5,404,291 A | 4/1995 | Kerr et al. | |
| 5,422,816 A | 6/1995 | Sprague et al. | |
| 5,459,859 A | 10/1995 | Senda | |

(Continued)

FOREIGN PATENT DOCUMENTS

| | | |
|---|---|---|
| JP | 2002334115 | 11/2002 |
| JP | 2004334409 | 11/2004 |

OTHER PUBLICATIONS

Sung-Won Jung et al., Intelligent Integration of Information on the Internet for Travelers on Demand, 2001, IEEE, 338-342.*

(Continued)

*Primary Examiner* — Jean B Fleurantin
(74) *Attorney, Agent, or Firm* — Greenberg Traurig, LLP (57) ABSTRACT

A system and method for searching travel services. A server computer receives a travel request from a client device operated by a user. The server computer identifies travel options according to the travel request. The server computer classifies the travel options into predefined groups, the classifying based on at least one of past transactions, input from domain experts, input from semantic analysts, analytics data, user preferences, and company policies. The server computer presents the options via presentation of the predefined groups.

19 Claims, 8 Drawing Sheets

(56) References Cited

U.S. PATENT DOCUMENTS

| | | |
|---|---|---|
| 5,513,126 A | 4/1996 | Harkins et al. |
| 5,548,515 A | 8/1996 | Pilley et al. |
| 5,559,707 A | 9/1996 | DeLorme et al. |
| 5,615,121 A | 3/1997 | Babayev et al. |
| 5,623,404 A | 4/1997 | Collins et al. |
| 5,655,081 A | 8/1997 | Bonnell et al. |
| 5,754,953 A | 5/1998 | Briancon et al. |
| 5,765,140 A | 6/1998 | Knudson |
| 5,790,974 A | 8/1998 | Tognazzini |
| 5,802,492 A | 9/1998 | DeLorme et al. |
| 5,809,250 A | 9/1998 | Kisor |
| 5,812,844 A | 9/1998 | Jones et al. |
| 5,832,451 A | 11/1998 | Flake et al. |
| 5,832,453 A | 11/1998 | O'Brien |
| 5,839,114 A | 11/1998 | Lynch et al. |
| 5,850,433 A | 12/1998 | Rondeau |
| 5,862,490 A | 1/1999 | Sasuta et al. |
| 5,875,436 A | 2/1999 | Kikinis |
| 5,901,352 A | 5/1999 | St-Pierre et al. |
| 5,933,485 A | 8/1999 | Chang et al. |
| 5,943,652 A | 8/1999 | Sisley et al. |
| 5,948,040 A | 9/1999 | DeLorme et al. |
| 5,953,706 A | 9/1999 | Patel |
| 5,963,861 A | 10/1999 | Hanson |
| 5,963,913 A | 10/1999 | Henneuse et al. |
| 5,966,658 A | 10/1999 | Kennedy et al. |
| 5,987,377 A | 11/1999 | Westerlage et al. |
| 6,011,976 A | 1/2000 | Michaels et al. |
| 6,016,478 A | 1/2000 | Zhang et al. |
| 6,018,715 A | 1/2000 | Lynch et al. |
| 6,023,679 A | 2/2000 | Acebo et al. |
| 6,023,722 A | 2/2000 | Colyer |
| 6,035,332 A | 3/2000 | Ingrassia et al. |
| 6,038,542 A | 3/2000 | Ruckdashel |
| 6,041,305 A | 3/2000 | Sakurai |
| 6,044,257 A | 3/2000 | Boling et al. |
| 6,047,327 A | 4/2000 | Tso et al. |
| 6,052,563 A | 4/2000 | Macko |
| 6,058,179 A | 5/2000 | Shaffer et al. |
| 6,076,108 A | 6/2000 | Courts et al. |
| 6,085,166 A | 7/2000 | Beckhardt et al. |
| 6,091,956 A | 7/2000 | Hollenberg |
| 6,094,681 A | 7/2000 | Shaffer et al. |
| 6,101,480 A | 8/2000 | Conmy et al. |
| 6,104,788 A | 8/2000 | Shaffer et al. |
| 6,119,094 A | 9/2000 | Lynch et al. |
| 6,134,534 A | 10/2000 | Walker et al. |
| 6,144,942 A | 11/2000 | Ruckdashei |
| 6,148,261 A | 11/2000 | Obradovich et al. |
| 6,157,945 A | 12/2000 | Balma et al. |
| 6,163,748 A | 12/2000 | Guenther |
| 6,169,955 B1 | 1/2001 | Fultz |
| 6,173,279 B1 | 1/2001 | Levin et al. |
| 6,177,905 B1 | 1/2001 | Welch |
| 6,188,905 B1 | 2/2001 | Rudrapatna et al. |
| 6,189,003 B1 | 2/2001 | Leal |
| 6,202,062 B1 | 3/2001 | Cameron et al. |
| 6,216,227 B1 | 4/2001 | Goldstein et al. |
| 6,240,396 B1 | 5/2001 | Walker et al. |
| 6,249,252 B1 | 6/2001 | Dupray |
| 6,286,046 B1 | 9/2001 | Bryant |
| 6,292,783 B1 | 9/2001 | Rohler et al. |
| 6,292,830 B1 | 9/2001 | Taylor et al. |
| 6,295,521 B1 | 9/2001 | DeMarcken et al. |
| 6,298,352 B1 | 10/2001 | Kannan et al. |
| 6,301,533 B1 | 10/2001 | Markow |
| 6,304,850 B1 | 10/2001 | Keller et al. |
| 6,317,686 B1 | 11/2001 | Ran |
| 6,321,158 B1 | 11/2001 | DeLorme et al. |
| 6,327,359 B1 | 12/2001 | Kang et al. |
| 6,334,109 B1 | 12/2001 | Kanevsky et al. |
| 6,336,072 B1 | 1/2002 | Takayama et al. |
| 6,349,238 B1 | 2/2002 | Gabbita et al. |
| 6,360,205 B1 | 3/2002 | Iyengar et al. |
| 6,370,566 B2 | 4/2002 | Discolo et al. |
| 6,381,578 B1 | 4/2002 | DeMarcken |
| 6,381,640 B1 | 4/2002 | Beck et al. |
| 6,389,454 B1 | 5/2002 | Ralston et al. |
| 6,392,669 B1 | 5/2002 | Matoba et al. |
| 6,396,920 B1 | 5/2002 | Cox et al. |
| 6,414,635 B1 | 7/2002 | Stewart et al. |
| 6,418,471 B1 | 7/2002 | Shelton et al. |
| 6,421,705 B1 | 7/2002 | Northrup |
| 6,442,526 B1 | 8/2002 | Vance et al. |
| 6,456,207 B1 | 9/2002 | Yen |
| 6,456,709 B1 | 9/2002 | Cox et al. |
| 6,457,045 B1 | 9/2002 | Hanson et al. |
| 6,457,062 B1 | 9/2002 | Pivowar et al. |
| 6,457,132 B1 | 9/2002 | Borgendale et al. |
| 6,466,161 B2 | 10/2002 | Turetzky et al. |
| 6,477,503 B1 | 11/2002 | Mankes |
| 6,480,830 B1 | 11/2002 | Ford et al. |
| 6,484,033 B2 | 11/2002 | Murray |
| 6,496,568 B1 | 12/2002 | Nelson |
| 6,501,421 B1 | 12/2002 | Dutta et al. |
| 6,519,571 B1 | 2/2003 | Guheen et al. |
| 6,529,136 B2 | 3/2003 | Cao et al. |
| 6,549,939 B1 | 4/2003 | Ford et al. |
| 6,553,346 B1 | 4/2003 | Walker et al. |
| 6,560,456 B1 | 5/2003 | Lohtia et al. |
| 6,571,213 B1 | 5/2003 | Altendahl et al. |
| 6,574,329 B2 | 6/2003 | Takeuchi et al. |
| 6,578,005 B1 | 6/2003 | Lesaint et al. |
| 6,580,914 B1 | 6/2003 | Smith |
| 6,584,489 B1 | 6/2003 | Jones et al. |
| 6,587,827 B1 | 7/2003 | Hennig et al. |
| 6,591,263 B1 | 7/2003 | Becker et al. |
| 6,618,668 B1 | 9/2003 | Laird |
| 6,631,363 B1 | 10/2003 | Brown et al. |
| 6,640,230 B1 | 10/2003 | Alexander et al. |
| 6,643,622 B2 | 11/2003 | Stuart et al. |
| 6,643,639 B2 | 11/2003 | Biebesheimer et al. |
| 6,650,902 B1 | 11/2003 | Richton |
| 6,658,093 B1 | 12/2003 | Langseth et al. |
| 6,662,016 B1 | 12/2003 | Buckham et al. |
| 6,675,151 B1 | 1/2004 | Thompson et al. |
| 6,687,678 B1 | 2/2004 | Yorimatsu et al. |
| 6,691,029 B2 | 2/2004 | Hughes et al. |
| 6,691,153 B1 | 2/2004 | Hanson et al. |
| 6,700,535 B2 | 3/2004 | Gilkes et al. |
| 6,701,311 B2 | 3/2004 | Biebesheimer et al. |
| 6,714,916 B1 | 3/2004 | Robertson et al. |
| 6,714,918 B2 | 3/2004 | Hillmer et al. |
| 6,732,080 B1 | 5/2004 | Blants |
| 6,732,103 B1 | 5/2004 | Strick et al. |
| 6,741,969 B1 | 5/2004 | Chen et al. |
| 6,757,689 B2 | 6/2004 | Battas et al. |
| 6,766,363 B1 | 7/2004 | Rothschild |
| 6,769,009 B1 | 7/2004 | Reisman |
| 6,775,371 B2 | 8/2004 | Elsey et al. |
| 6,788,946 B2 | 9/2004 | Winchell et al. |
| 6,801,226 B1 | 10/2004 | Daughtrey |
| 6,801,763 B2 | 10/2004 | Elsey et al. |
| 6,802,005 B1 | 10/2004 | Berson |
| 6,826,473 B1 | 11/2004 | Burch et al. |
| 6,836,537 B1 | 12/2004 | Zirngibl et al. |
| 6,842,737 B1 | 1/2005 | Stiles et al. |
| 6,845,370 B2 | 1/2005 | Burkey et al. |
| 6,847,988 B2 | 1/2005 | Toyouchi et al. |
| 6,857,017 B1 | 2/2005 | Faour et al. |
| 6,901,438 B1 | 5/2005 | Davis et al. |
| 6,907,119 B2 | 6/2005 | Case et al. |
| 6,909,903 B2 | 6/2005 | Wang |
| 6,934,684 B2 | 8/2005 | Alpdemir et al. |
| 6,937,991 B1 | 8/2005 | Zompa et al. |
| 6,944,273 B2 | 9/2005 | Huna |
| 6,944,447 B2 | 9/2005 | Portman et al. |
| 6,944,479 B2 | 9/2005 | Andaker et al. |
| 6,958,692 B1 | 10/2005 | Ratschunas |
| 6,970,871 B1 | 11/2005 | Rayburn |
| 6,980,993 B2 | 12/2005 | Horvitz et al. |
| 6,985,939 B2 | 1/2006 | Fletcher et al. |
| 6,993,503 B1 | 1/2006 | Heissenbuttel et al. |
| 6,993,554 B2 | 1/2006 | O'Donnell |

(56) References Cited

U.S. PATENT DOCUMENTS

| | | |
|---|---|---|
| 7,013,149 B2 | 3/2006 | Vetro et al. |
| 7,024,205 B1 | 4/2006 | Hose |
| 7,031,945 B2 | 4/2006 | Donner |
| 7,031,998 B2 | 4/2006 | Archbold |
| 7,050,986 B1 | 5/2006 | Vance et al. |
| 7,050,987 B2 | 5/2006 | Lettovsky et al. |
| 7,054,939 B2 | 5/2006 | Koch et al. |
| 7,071,842 B1 | 7/2006 | Brady, Jr. |
| 7,072,666 B1 | 7/2006 | Kullman et al. |
| 7,072,886 B2 | 7/2006 | Salmenkaita et al. |
| 7,076,431 B2 | 7/2006 | Kurganov et al. |
| 7,076,451 B1 | 7/2006 | Coupland et al. |
| 7,080,019 B1 | 7/2006 | Hurzeler |
| 7,080,021 B1 | 7/2006 | McCulloch |
| 7,092,892 B1 | 8/2006 | Sobalvarro et al. |
| 7,099,236 B2 | 8/2006 | Yamagishi |
| 7,099,855 B1 | 8/2006 | Nelken et al. |
| 7,103,572 B1 | 9/2006 | Kawaguchi et al. |
| 7,123,141 B2 | 10/2006 | Contestabile |
| 7,124,024 B1 | 10/2006 | Adelaide et al. |
| 7,124,087 B1 | 10/2006 | Rodriguez et al. |
| 7,124,089 B2 | 10/2006 | Cornwell |
| 7,130,885 B2 | 10/2006 | Chandra et al. |
| 7,136,821 B1 | 11/2006 | Kohavi et al. |
| 7,137,099 B2 | 11/2006 | Knight et al. |
| 7,139,718 B2 | 11/2006 | Jeyachandran et al. |
| 7,152,038 B2 | 12/2006 | Murashita et al. |
| 7,154,621 B2 | 12/2006 | Rodriguez et al. |
| 7,161,497 B2 | 1/2007 | Gueziec |
| 7,162,254 B1 | 1/2007 | Smith |
| 7,171,369 B1 | 1/2007 | Bertram et al. |
| 7,188,073 B1 | 3/2007 | Tam et al. |
| 7,213,048 B1 | 5/2007 | Parupudi et al. |
| 7,222,334 B2 | 5/2007 | Casati et al. |
| 7,233,955 B2 | 6/2007 | Machida et al. |
| 7,236,942 B1 | 6/2007 | Walker et al. |
| RE39,717 E | 7/2007 | Yates et al. |
| 7,263,506 B2 | 8/2007 | Lee et al. |
| 7,263,664 B1 | 8/2007 | Daughtrey |
| 7,277,923 B2 | 10/2007 | Rensin et al. |
| 7,280,823 B2 | 10/2007 | Ternullo et al. |
| 7,284,002 B2 | 10/2007 | Doss et al. |
| 7,287,093 B2 | 10/2007 | Lynch et al. |
| 7,289,812 B1 | 10/2007 | Roberts et al. |
| 7,299,286 B2 | 11/2007 | Ramsayer et al. |
| 7,300,346 B2 | 11/2007 | Lydon et al. |
| 7,305,356 B2 | 12/2007 | Rodon |
| 7,305,454 B2 | 12/2007 | Reese et al. |
| 7,328,406 B2 | 2/2008 | Kalinoski et al. |
| 7,330,112 B1 | 2/2008 | Emigh et al. |
| 7,337,125 B2 | 2/2008 | Kraft et al. |
| 7,340,048 B2 | 3/2008 | Stern et al. |
| 7,340,402 B1 * | 3/2008 | DeMarcken ............... 705/5 |
| 7,340,403 B1 | 3/2008 | DeMarcken |
| 7,343,165 B2 | 3/2008 | Obradovich |
| 7,343,338 B2 | 3/2008 | Etkin |
| 7,353,182 B1 | 4/2008 | Missinhoun et al. |
| 7,367,491 B2 | 5/2008 | Cheng et al. |
| 7,376,662 B2 | 5/2008 | Caparas et al. |
| 7,383,225 B2 | 6/2008 | Hallihan |
| 7,418,409 B1 | 8/2008 | Goel |
| 7,428,302 B2 | 9/2008 | Zirngibl et al. |
| 7,430,724 B2 | 9/2008 | Othmer |
| 7,441,203 B2 | 10/2008 | Othmer et al. |
| 7,451,134 B2 * | 11/2008 | Krakowiecki et al. |
| 7,506,805 B1 | 3/2009 | Chakravarthy |
| 7,561,963 B2 | 7/2009 | Brice et al. |
| 7,565,331 B2 | 7/2009 | Cutler et al. |
| 7,599,847 B2 | 10/2009 | Block et al. |
| 7,599,858 B1 | 10/2009 | Grady |
| 7,681,786 B1 | 3/2010 | Chakravarthy |
| 7,706,808 B1 | 4/2010 | Aggarwal et al. |
| 7,742,954 B1 | 6/2010 | Handel |
| 7,761,386 B2 | 7/2010 | Teicher |
| 7,806,328 B2 | 10/2010 | Chakravarthy |
| 7,925,540 B1 | 4/2011 | Orttung |
| 7,970,666 B1 | 6/2011 | Handel et al. |
| 8,117,073 B1 | 2/2012 | Orttung |
| 8,180,796 B1 | 5/2012 | Mah et al. |
| 8,972,434 B2 * | 3/2015 | English et al. ............... 707/765 |
| 2001/0014866 A1 | 8/2001 | Conmy et al. |
| 2001/0014867 A1 | 8/2001 | Conmy |
| 2001/0021928 A1 | 9/2001 | Ludwig et al. |
| 2001/0025314 A1 | 9/2001 | Matsumoto et al. |
| 2001/0029425 A1 | 10/2001 | Myr |
| 2001/0044748 A1 | 11/2001 | Maier |
| 2001/0047316 A1 | 11/2001 | Hallihan |
| 2001/0049637 A1 | 12/2001 | Tso |
| 2001/0051876 A1 | 12/2001 | Seigel et al. |
| 2001/0056354 A1 | 12/2001 | Feit et al. |
| 2002/0000930 A1 | 1/2002 | Crowson et al. |
| 2002/0007327 A1 | 1/2002 | Steury et al. |
| 2002/0010604 A1 | 1/2002 | Block |
| 2002/0010664 A1 | 1/2002 | Rabideau et al. |
| 2002/0013729 A1 | 1/2002 | Kida |
| 2002/0016723 A1 | 2/2002 | Matsui et al. |
| 2002/0023132 A1 | 2/2002 | Tornabene et al. |
| 2002/0026336 A1 | 2/2002 | Eizenburg et al. |
| 2002/0029178 A1 | 3/2002 | Wiederin et al. |
| 2002/0032591 A1 | 3/2002 | Mahaffy et al. |
| 2002/0032597 A1 | 3/2002 | Chanos |
| 2002/0035474 A1 | 3/2002 | Alpdemir |
| 2002/0046076 A1 | 4/2002 | Baillargeon et al. |
| 2002/0046301 A1 | 4/2002 | Shannon et al. |
| 2002/0049644 A1 | 4/2002 | Kargman |
| 2002/0055906 A1 | 5/2002 | Katz et al. |
| 2002/0057212 A1 | 5/2002 | Hamilton et al. |
| 2002/0065688 A1 | 5/2002 | Charlton et al. |
| 2002/0067308 A1 | 6/2002 | Robertson |
| 2002/0069093 A1 | 6/2002 | Stanfield |
| 2002/0072938 A1 | 6/2002 | Black et al. |
| 2002/0073088 A1 | 6/2002 | Beckmann et al. |
| 2002/0077122 A1 | 6/2002 | Yule |
| 2002/0077871 A1 | 6/2002 | Udelhoven et al. |
| 2002/0082978 A1 | 6/2002 | Ghouri et al. |
| 2002/0087367 A1 | 7/2002 | Azani |
| 2002/0087384 A1 | 7/2002 | Neifeld |
| 2002/0087706 A1 | 7/2002 | Ogawa |
| 2002/0095454 A1 | 7/2002 | Reed et al. |
| 2002/0099613 A1 | 7/2002 | Swart et al. |
| 2002/0103746 A1 | 8/2002 | Moffett |
| 2002/0107027 A1 | 8/2002 | O'Neil |
| 2002/0111845 A1 | 8/2002 | Chong |
| 2002/0111848 A1 | 8/2002 | White |
| 2002/0115430 A1 | 8/2002 | Hall |
| 2002/0116235 A1 | 8/2002 | Grimm et al. |
| 2002/0118118 A1 | 8/2002 | Myllymaki |
| 2002/0120519 A1 | 8/2002 | Martin et al. |
| 2002/0120548 A1 | 8/2002 | Etkin |
| 2002/0123280 A1 | 9/2002 | Saiz |
| 2002/0128903 A1 | 9/2002 | Kernahan |
| 2002/0131565 A1 | 9/2002 | Scheuring et al. |
| 2002/0143655 A1 | 10/2002 | Elston et al. |
| 2002/0143819 A1 | 10/2002 | Han et al. |
| 2002/0151321 A1 | 10/2002 | Winchell et al. |
| 2002/0152190 A1 | 10/2002 | Biebesheimer et al. |
| 2002/0156659 A1 | 10/2002 | Walker et al. |
| 2002/0156731 A1 | 10/2002 | Seki et al. |
| 2002/0156839 A1 | 10/2002 | Peterson et al. |
| 2002/0161611 A1 | 10/2002 | Price et al. |
| 2002/0161701 A1 | 10/2002 | Warmack |
| 2002/0165732 A1 | 11/2002 | Ezzeddine et al. |
| 2002/0165903 A1 | 11/2002 | Zargham et al. |
| 2002/0178034 A1 | 11/2002 | Gardner et al. |
| 2002/0178226 A1 | 11/2002 | Anderson et al. |
| 2002/0184302 A1 | 12/2002 | Prueitt et al. |
| 2002/0194037 A1 | 12/2002 | Creed et al. |
| 2002/0194119 A1 | 12/2002 | Wright et al. |
| 2002/0194262 A1 | 12/2002 | Jorgenson |
| 2002/0198747 A1 | 12/2002 | Boyer et al. |
| 2003/0004762 A1 | 1/2003 | Banerjee et al. |
| 2003/0013438 A1 | 1/2003 | Darby |
| 2003/0018499 A1 | 1/2003 | Miller et al. |
| 2003/0018551 A1 | 1/2003 | Hanson et al. |

(56) References Cited

U.S. PATENT DOCUMENTS

| | | |
|---|---|---|
| 2003/0018808 A1 | 1/2003 | Brouk et al. |
| 2003/0023463 A1 | 1/2003 | Dombroski et al. |
| 2003/0028390 A1 | 2/2003 | Stern et al. |
| 2003/0033179 A1 | 2/2003 | Katz et al. |
| 2003/0036917 A1 | 2/2003 | Hite et al. |
| 2003/0036928 A1 | 2/2003 | Kenigsberg et al. |
| 2003/0040944 A1 | 2/2003 | Hileman |
| 2003/0041178 A1 | 2/2003 | Brouk et al. |
| 2003/0050964 A1 | 3/2003 | Debaty et al. |
| 2003/0053459 A1 | 3/2003 | Brouk et al. |
| 2003/0053611 A1 | 3/2003 | Lee |
| 2003/0055689 A1 | 3/2003 | Block et al. |
| 2003/0055723 A1 | 3/2003 | English |
| 2003/0058842 A1 | 3/2003 | Bud |
| 2003/0061145 A1 | 3/2003 | Norrid |
| 2003/0065556 A1 | 4/2003 | Takanashi et al. |
| 2003/0065805 A1 | 4/2003 | Barnes |
| 2003/0087648 A1 | 5/2003 | Mezhvinsky et al. |
| 2003/0100315 A1 | 5/2003 | Rankin |
| 2003/0109266 A1* | 6/2003 | Rafiah et al. ............. 455/456 |
| 2003/0110070 A1 | 6/2003 | De Goeij |
| 2003/0110091 A1 | 6/2003 | Inaba et al. |
| 2003/0120526 A1 | 6/2003 | Altman et al. |
| 2003/0120530 A1 | 6/2003 | Casati et al. |
| 2003/0120593 A1 | 6/2003 | Bansal et al. |
| 2003/0126095 A1 | 7/2003 | Allen |
| 2003/0126250 A1 | 7/2003 | Jhanji |
| 2003/0140172 A1 | 7/2003 | Woods et al. |
| 2003/0149641 A1 | 8/2003 | Kouketsu et al. |
| 2003/0149781 A1 | 8/2003 | Yared et al. |
| 2003/0154116 A1 | 8/2003 | Lofton |
| 2003/0158493 A1 | 8/2003 | Nicholson |
| 2003/0158776 A1 | 8/2003 | Landesmann |
| 2003/0158784 A1 | 8/2003 | Shaver et al. |
| 2003/0158847 A1 | 8/2003 | Wissner et al. |
| 2003/0163251 A1 | 8/2003 | Obradovich et al. |
| 2003/0165223 A1 | 9/2003 | Timmins et al. |
| 2003/0171944 A1 | 9/2003 | Fine et al. |
| 2003/0171973 A1 | 9/2003 | Wilce et al. |
| 2003/0172020 A1 | 9/2003 | Davies et al. |
| 2003/0177020 A1 | 9/2003 | Okamura |
| 2003/0177045 A1 | 9/2003 | Fitzgerald et al. |
| 2003/0182413 A1 | 9/2003 | Allen et al. |
| 2003/0187743 A1 | 10/2003 | Kumaran et al. |
| 2003/0195811 A1 | 10/2003 | Hayes et al. |
| 2003/0204622 A1 | 10/2003 | Blizniak et al. |
| 2003/0212486 A1 | 11/2003 | Hughes et al. |
| 2003/0212800 A1 | 11/2003 | Jones et al. |
| 2003/0217044 A1 | 11/2003 | Zhang et al. |
| 2003/0220835 A1 | 11/2003 | Barnes, Jr. |
| 2003/0225600 A1 | 12/2003 | Slivka et al. |
| 2003/0229900 A1 | 12/2003 | Reisman |
| 2003/0233278 A1 | 12/2003 | Marshall |
| 2004/0002876 A1 | 1/2004 | Sommers et al. |
| 2004/0014457 A1 | 1/2004 | Stevens |
| 2004/0015380 A1 | 1/2004 | Timmins |
| 2004/0019606 A1 | 1/2004 | Ackerman et al. |
| 2004/0030568 A1 | 2/2004 | Kocznar et al. |
| 2004/0039613 A1 | 2/2004 | Maycotte et al. |
| 2004/0045004 A1 | 3/2004 | Cheenath |
| 2004/0054569 A1 | 3/2004 | Pombo et al. |
| 2004/0054574 A1 | 3/2004 | Kaufman et al. |
| 2004/0064355 A1 | 4/2004 | Dorenbosch et al. |
| 2004/0064445 A1 | 4/2004 | Pfleging et al. |
| 2004/0064503 A1 | 4/2004 | Karakashian et al. |
| 2004/0064585 A1 | 4/2004 | Doss et al. |
| 2004/0073615 A1 | 4/2004 | Darling |
| 2004/0076280 A1 | 4/2004 | Ando et al. |
| 2004/0078247 A1 | 4/2004 | Rowe et al. |
| 2004/0078373 A1 | 4/2004 | Ghoneimy et al. |
| 2004/0088107 A1 | 5/2004 | Seligmann |
| 2004/0088392 A1 | 5/2004 | Barrett et al. |
| 2004/0093290 A1 | 5/2004 | Doss et al. |
| 2004/0098269 A1 | 5/2004 | Wise et al. |
| 2004/0102979 A1 | 5/2004 | Robertson et al. |
| 2004/0128173 A1 | 7/2004 | Salonen |
| 2004/0133438 A1 | 7/2004 | Zeisset et al. |
| 2004/0139151 A1 | 7/2004 | Flurry et al. |
| 2004/0148207 A1* | 7/2004 | Smith et al. ............. 705/6 |
| 2004/0153350 A1 | 8/2004 | Kim et al. |
| 2004/0158493 A1 | 8/2004 | Nicholson |
| 2004/0161097 A1 | 8/2004 | Henry |
| 2004/0181572 A1 | 9/2004 | Lee et al. |
| 2004/0184593 A1 | 9/2004 | Elsey et al. |
| 2004/0186891 A1 | 9/2004 | Panec et al. |
| 2004/0193457 A1 | 9/2004 | Shogren |
| 2004/0199411 A1 | 10/2004 | Bertram et al. |
| 2004/0203909 A1 | 10/2004 | Koster |
| 2004/0220847 A1 | 11/2004 | Ogushi et al. |
| 2004/0220854 A1 | 11/2004 | Postrel |
| 2004/0224703 A1 | 11/2004 | Takaki et al. |
| 2004/0236616 A1 | 11/2004 | Daughtrey |
| 2004/0248551 A1 | 12/2004 | Rowitch et al. |
| 2004/0249568 A1 | 12/2004 | Endo et al. |
| 2004/0249758 A1 | 12/2004 | Sukeda et al. |
| 2004/0267611 A1 | 12/2004 | Hoerenz |
| 2005/0004819 A1 | 1/2005 | Etzioni et al. |
| 2005/0010472 A1 | 1/2005 | Quatse et al. |
| 2005/0015316 A1 | 1/2005 | Salluzzo |
| 2005/0027570 A1 | 2/2005 | Maier et al. |
| 2005/0033614 A1 | 2/2005 | Lettovsky et al. |
| 2005/0033615 A1 | 2/2005 | Nguyen et al. |
| 2005/0033616 A1 | 2/2005 | Vavul et al. |
| 2005/0033670 A1 | 2/2005 | Cheng et al. |
| 2005/0040944 A1 | 2/2005 | Contestabile |
| 2005/0053220 A1 | 3/2005 | Helbling et al. |
| 2005/0060210 A1 | 3/2005 | Levi et al. |
| 2005/0075913 A1 | 4/2005 | Brugger et al. |
| 2005/0086098 A1 | 4/2005 | Fulton et al. |
| 2005/0091005 A1 | 4/2005 | Huard |
| 2005/0101335 A1 | 5/2005 | Kelly et al. |
| 2005/0125265 A1 | 6/2005 | Bramnick et al. |
| 2005/0125439 A1 | 6/2005 | Nourbakhsh et al. |
| 2005/0125804 A1 | 6/2005 | Dievendorff et al. |
| 2005/0131761 A1 | 6/2005 | Trika et al. |
| 2005/0143064 A1 | 6/2005 | Pines et al. |
| 2005/0149385 A1 | 7/2005 | Trively |
| 2005/0187703 A1 | 8/2005 | Seligmann |
| 2005/0209772 A1 | 9/2005 | Yoshikawa et al. |
| 2005/0209902 A1 | 9/2005 | Iwasaki et al. |
| 2005/0215247 A1 | 9/2005 | Kobylarz |
| 2005/0216301 A1 | 9/2005 | Brown |
| 2005/0227712 A1 | 10/2005 | Estevez et al. |
| 2005/0234928 A1 | 10/2005 | Shkvarchuk et al. |
| 2005/0255861 A1 | 11/2005 | Wilson et al. |
| 2005/0288948 A1 | 12/2005 | Devulapalli et al. |
| 2006/0004511 A1 | 1/2006 | Yoshikawa et al. |
| 2006/0004590 A1 | 1/2006 | Khoo |
| 2006/0009987 A1 | 1/2006 | Wang |
| 2006/0010206 A1 | 1/2006 | Apacible et al. |
| 2006/0036586 A1* | 2/2006 | Krakowiecki et al. ........... 707/3 |
| 2006/0041586 A1 | 2/2006 | Nassef |
| 2006/0059023 A1 | 3/2006 | Mashinsky |
| 2006/0059024 A1 | 3/2006 | Bailey et al. |
| 2006/0059107 A1 | 3/2006 | Elmore et al. |
| 2006/0068787 A1 | 3/2006 | Deshpande et al. |
| 2006/0080257 A1 | 4/2006 | Vaughan et al. |
| 2006/0080321 A1 | 4/2006 | Horn et al. |
| 2006/0085512 A1 | 4/2006 | Handel et al. |
| 2006/0095329 A1 | 5/2006 | Kim |
| 2006/0106655 A1 | 5/2006 | Lettovsky et al. |
| 2006/0109106 A1 | 5/2006 | Braun |
| 2006/0111955 A1 | 5/2006 | Winter et al. |
| 2006/0129438 A1 | 6/2006 | Robinson |
| 2006/0178932 A1 | 8/2006 | Lang |
| 2006/0178949 A1 | 8/2006 | McGrath |
| 2006/0190287 A1 | 8/2006 | Forshaw |
| 2006/0206363 A1* | 9/2006 | Gove ............. 705/6 |
| 2006/0220374 A1 | 10/2006 | Dorn et al. |
| 2006/0239295 A1 | 10/2006 | Rao et al. |
| 2006/0241983 A1 | 10/2006 | Viale et al. |
| 2006/0259353 A1 | 11/2006 | Gutmann |

(56) References Cited

U.S. PATENT DOCUMENTS

| | | |
|---|---|---|
| 2006/0287897 A1 | 12/2006 | Sobalvarro et al. |
| 2007/0011034 A1 | 1/2007 | Jones et al. |
| 2007/0016439 A1 | 1/2007 | Stiles et al. |
| 2007/0060099 A1 | 3/2007 | Ramer et al. |
| 2007/0066397 A1 | 3/2007 | Nammi et al. |
| 2007/0083327 A1 | 4/2007 | Brice et al. |
| 2007/0123280 A1 | 5/2007 | McGary et al. |
| 2007/0150349 A1 | 6/2007 | Handel |
| 2007/0174438 A9 | 7/2007 | Johnson et al. |
| 2007/0198432 A1 | 8/2007 | Pitroda et al. |
| 2007/0208604 A1 | 9/2007 | Purohit et al. |
| 2007/0260989 A1 | 11/2007 | Vakil et al. |
| 2008/0004917 A1 | 1/2008 | Mortimore |
| 2008/0004918 A1 | 1/2008 | Orttung |
| 2008/0004919 A1 | 1/2008 | Stubbs |
| 2008/0004921 A1 | 1/2008 | Orttung |
| 2008/0004980 A1 | 1/2008 | Hernandez |
| 2008/0010100 A1 | 1/2008 | Orttung |
| 2008/0040188 A1 | 2/2008 | Klausmeier |
| 2008/0046298 A1 | 2/2008 | Ben-Yehuda et al. |
| 2008/0052159 A1 | 2/2008 | Balakrishnan |
| 2008/0065509 A1 | 3/2008 | Williams |
| 2008/0072067 A1 | 3/2008 | Koretz |
| 2008/0086564 A1 | 4/2008 | Putman et al. |
| 2008/0091342 A1 | 4/2008 | Assael |
| 2008/0091445 A1 | 4/2008 | Mihic |
| 2008/0091477 A1 | 4/2008 | Mortimore, Jr. |
| 2008/0091478 A1 | 4/2008 | Messa |
| 2008/0091479 A1 | 4/2008 | Mortimore, Jr. et al. |
| 2008/0103842 A1 | 5/2008 | Johnson |
| 2008/0126143 A1 | 5/2008 | Altman et al. |
| 2008/0147450 A1 | 6/2008 | Mortimore |
| 2008/0155470 A1 | 6/2008 | Khedouri et al. |
| 2008/0167912 A1* | 7/2008 | De Marcken ............... 705/6 |
| 2008/0201197 A1 | 8/2008 | Orttung |
| 2008/0201432 A1 | 8/2008 | Orttung |
| 2008/0256036 A1* | 10/2008 | Falk et al. ............... 707/3 |
| 2009/0006143 A1 | 1/2009 | Orttung |
| 2009/0030609 A1 | 1/2009 | Orttung |
| 2009/0030742 A1 | 1/2009 | Orttung |
| 2009/0030769 A1 | 1/2009 | Orttung |
| 2009/0106077 A1 | 4/2009 | Bhogal et al. |
| 2009/0150343 A1* | 6/2009 | English et al. ............ 707/3 |
| 2009/0210261 A1 | 8/2009 | Mortimore, Jr. |
| 2009/0234564 A1 | 9/2009 | Onishi et al. |
| 2009/0248457 A1 | 10/2009 | Munter |
| 2010/0153192 A1* | 6/2010 | Hamilton et al. ............ 705/13 |
| 2010/0211419 A1 | 8/2010 | Nickolayev et al. |
| 2015/0161527 A1* | 6/2015 | English et al. ............ 707/765 |

OTHER PUBLICATIONS

Alag, Satnam et al., U.S. Appl. No. 11/067,537, entitled "Platform for Multi-service Procurement," filed Feb. 24, 2005, All pages.

Amendment and Response to Non-Final Office Action filed at the U.S. Patent & Trademark Office on Oct. 27, 2008, for U.S. Appl. No. 11/388,360, All pages.

Baker, Michael B., "Selecting a Corporate Payment System," Business Travel News, vol. 23, Issue 7, p. 89, Apr. 24, 2006, All pages.

Chakravarthy, Sriram et al., U.S. Appl. No. 11/178,107, entitled "Asynchronous, Location Independent Web Service Invocation," filed Jul. 7, 2005, All pages.

Grady, Patrick et al., U.S. Appl. No. 10/338,363, entitled "Automatic Services Exchange," filed Jan. 7, 2003, All pages.

Grady, Patrick et al., U.S. Appl. No. 10/855,269, entitled "Coordination for Group Procurement of Services," filed May 26, 2004, All pages.

Handel, Sean et al., U.S. Appl. No. 11/321,769, entitled "Method and System for Prediction and Delivery of Time and Context Sensitive Services," filed Dec. 28, 2005, All pages.

Handel, Sean et al., U.S. Appl. No. 11/388,360, entitled "Method and System for Traffic Tracking and Conversion Tracking," filed Mar. 23, 2006, All pages.

Handel, Sean et al., U.S. Appl. No. 11/388,540, entitled "Method and System for Resource Planning for Service Provider," filed Mar. 23, 2006, All pages.

Handel, Sean et al., U.S. Appl. No. 11/395,413, entitled "Method and System for Viral Distribution of Short-term Location Orientated Offers," filed Mar. 30, 2006, All pages.

Hernandez, Rick et al., U.S. Appl. No. 11/323,766, entitled "Method and System for Transferring of Stateful Screen in a Stateless Session," filed Dec. 30, 2005, All pages.

Hwang, Yong Ho et al., "An efficient revocation scheme for stateless receieivers," Editors: Katsikas -S-K, Gritzalis-S, Lopez-J, Jun. 2004, pp. 1-2.

Orttung, Mark et al., U.S. Appl. No. 11/178,007, entitled "System for Travel Services Resource Sharing," filed Jul. 7, 2005, All pages.

Paranadi, Shiva et al., U.S. Appl. No. 11/315,421, entitled "Method and System for Interacting Via Messages with a Travel Services System," filed Dec. 21, 2005, All pages.

Patwardhan, Shantau et al., U.S. Appl. No. 11/121,861, entitled "Method and System for Reporting Work Hours by Phone or Other E-Media," filed May 3, 2005, All pages.

Patwardhan, Shantau et al., U.S. Appl. No. 11/178,032, entitled "Method and System for Booking an Open Return Ticket Online," filed Jul. 7, 2005, All pages.

Reed, Dan et al., "More people find ways to squeeze fun into work trips; for many business travelers, taking family or friends on a trip at relatively low cost has become a handy job perk," USA Today, McLean VA, May 20, 2003, p. E12, All pages.

Sharkey, Joe, "Leisure activities are increasingly being fitted in to help make life on the road less of a grind," The New York Times, New York, N. Y., Apr. 18, 2001, p. C6, All pages.

* cited by examiner (Prior Art)
Fig. 1

R REARDEN
 commerce garner for Myself   garner's Profile   Help   Sign out
ACME

| Home | Travel | Dining |

Travel  Select your flights
View results by  Recommendations  Plane  Schedule
Based on your search we categorized 1,063 flights into these four themes:

| Company Value — 615 from $314 per person | | Lowest Cost — 605 from $310 per person | | Fastest Flights — 610 from $314 per person | | Comfort and Ease — 620 from $378 per person | |
|---|---|---|---|---|---|---|---|
| AA American Airlines | The best value matches for your company | Multiple Airlines | The absolute lowest fares | AA American Airlines | Get there with the shortest travel time | Delta Air lines | Get amenities like in-seat video, WiFi and power outlets |
| | More Like This | | More Like This | | More Like This | | More Like This |

Airfares are subject to change. Total fare includes taxes and fees. A + indicates a service fee is included in the price.

Your Search ✓ 630  Modify Search
1063 of 1500 results
$314 per person

| AA | American Airlines 1172 | [Preferred] | Restricted Coach | | ⊕ More Deals — 640 |
| | SAN 1:05 PM (Jul 12) | | 3h 5m (Non-stop) I seat spec | |
| | DFW 6:10 PM | | | |

| AA | American Airlines 1084 | [Preferred] | Restricted Coach | | ⊕ More Deals |
| | DFW 7:00 PM (Jul 12) | | 2h 45m (Non-stop) I seat spec | |
| | FLL 10:05 PM | | | |
| | Comments: tight connection | | | |

| AA | American Airlines 1241 | [Preferred] | Restricted Coach | | ⊕ More Deals |
| | FLL 10:05 AM (Jul 13) | | 2h 55m (Non-stop) I seat spec | |
| | DFW 12:00 PM | | | |

1-10 of 1063 ▷ ▷|

Flights Times:
 Leave  Return
Tuesday 7/12/11
Depart: Tue 6:15AM - Tue 11:00PM
Arrive: Tue 4:00PM - Wed 10:45AM Nearby Airports
Depart:   Arrive:
SAN       FLL

TRAVEL SERVICES SEARCH

RELATED APPLICATIONS

This application claims the benefit of Provisional Patent Application No. 61/488,567 filed on May 20, 2011, which is incorporated herein by reference in its entirety.

FIELD OF THE INVENTION

The present disclosure relates to traveling, and more specifically to searching for flights, hotels, and other travel services.

BACKGROUND OF THE INVENTION

Searching for flights, hotels, and other travel services is highly cumbersome today. The process inherently involves making a series of complicated decisions and tradeoffs and most tools today simply offload that burden entirely to the user. Tools today do not enable a user to trade-off between traveling attributes.

BRIEF SUMMARY OF THE INVENTION

Additionally, tools that provide recommendations relating to travel services to users are not personalized to the user.

In one aspect, a server computer receives a travel request from a client device operated by a user. The server computer identifies travel options according to the travel request. The server computer classifies the travel options into predefined groups, the classifying based on at least one of past transactions, input from domain experts, input from semantic analysts, analytics data, user preferences, and company policies. The server computer presents the options via presentation of the predefined groups.

In one embodiment, the presenting of the options further includes presenting options personalized for the user. In one embodiment, the server computer defines groups, and the defining can be personalized for the user. In one embodiment, the classifying of the travel options into the predefined groups includes defining, by the user, a function to classify an option. In one embodiment, the defining of the function includes defining the function via one or more up/down votes. A first group can be classified, and the classifying can be based on a model function of the first group. The classifying of the first group can be based on attributes associated with the travel options.

In one embodiment, the server computer determines buckets specifically for the user. In one embodiment, the server computer provides, to the client device, the plurality of buckets as recommendations for the user based on the travel request. The determining of the buckets can include determining buckets that are personalized to a user's search behavior and/or based on the user's social connections.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. Fore example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
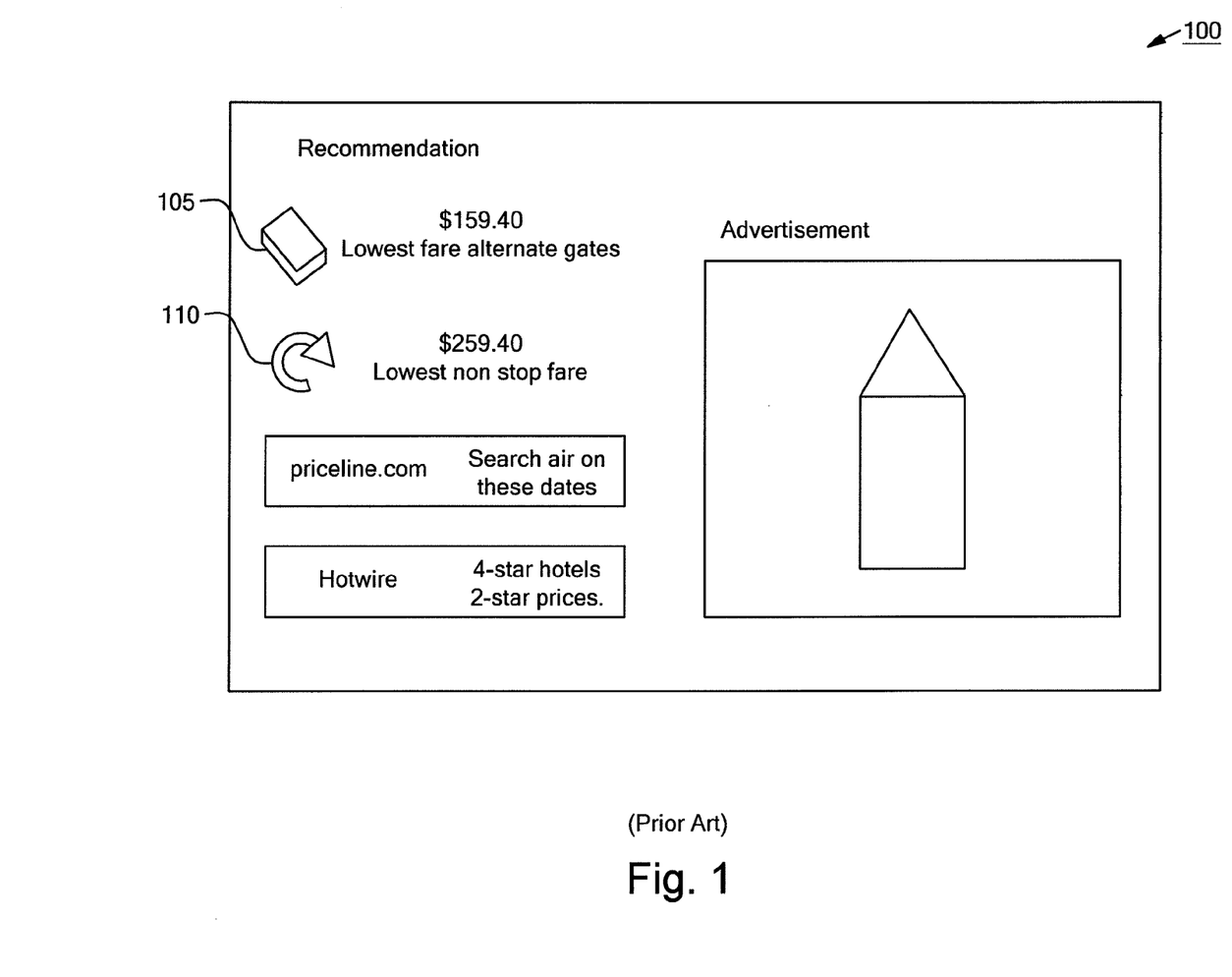
FIG. 1 is a user interface associated with a web site existing in the prior art.

FIG. 1 is an example of a user interface 100 associated with a web site (mobisimmo.com) existing in the prior art. The user interface 100 includes a first recommendation 105 and a second recommendation 110. The first recommendation 105 is a recommendation of a lowest fare available for alternate dates of a flight. The second recommendation 110 is a recommendation of the cheapest non-stop flight. The recommendations 105, 110 do not allow the user to trade-off between any two travel attributes (such as flight time and flight price). Further, the recommendations 105, 110 do not take into account user preferences.

Figure 2:
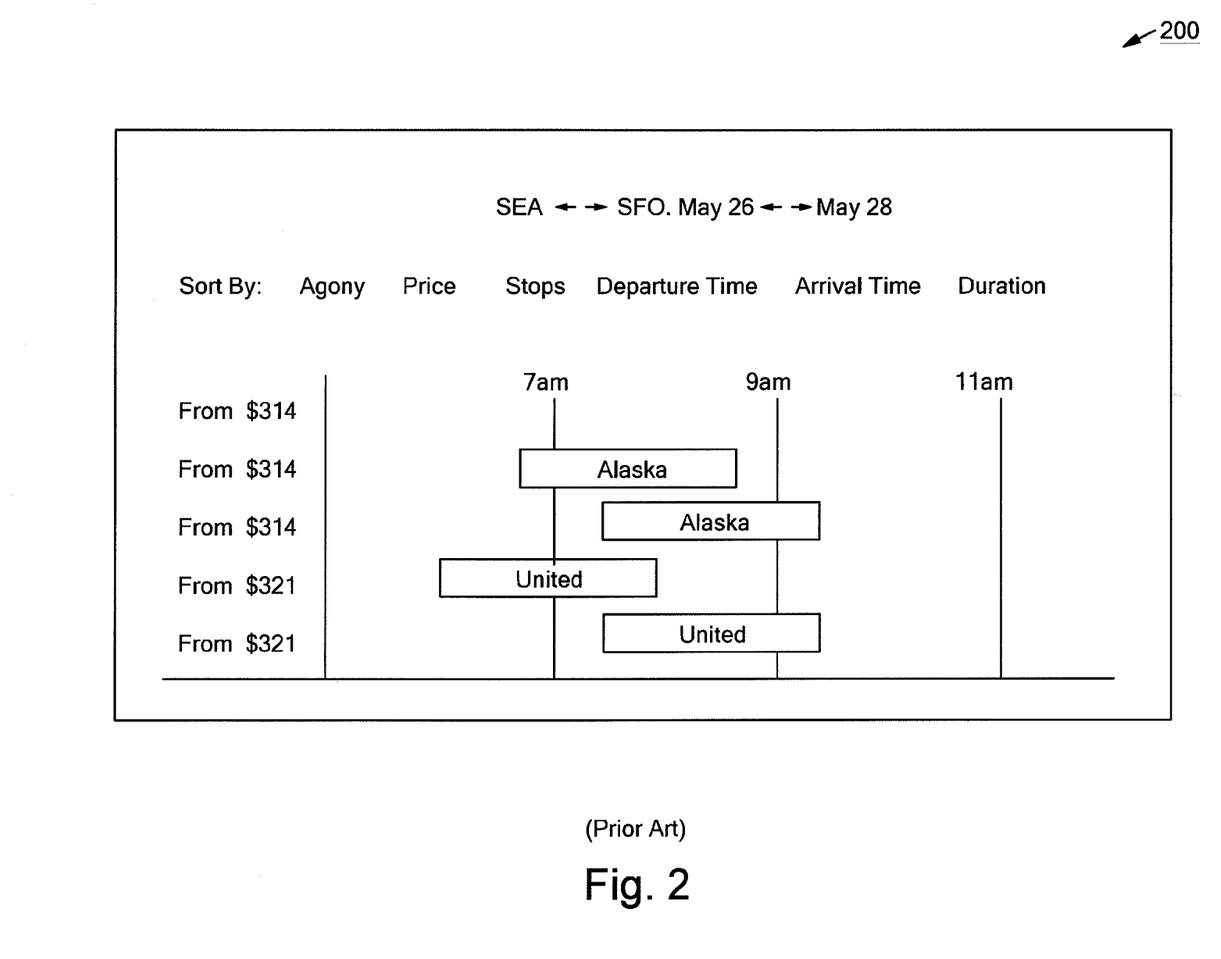
FIG. 2 is another user interface associated with a web site existing in the prior art.

FIG. 2 is another example of a user interface 200 associated with a web site (hipmunk.com) existing in the prior art. The user interface 200 introduces an Agony score to help users rank flights. The criteria used to build the Agony store is time, duration, and number of stops of the flight solution. The user interface 200 does not, however, attempt to provide recommendations. Further, the user interface 200 does not attempt to personalize any recommendations to the user.

Figure 3:
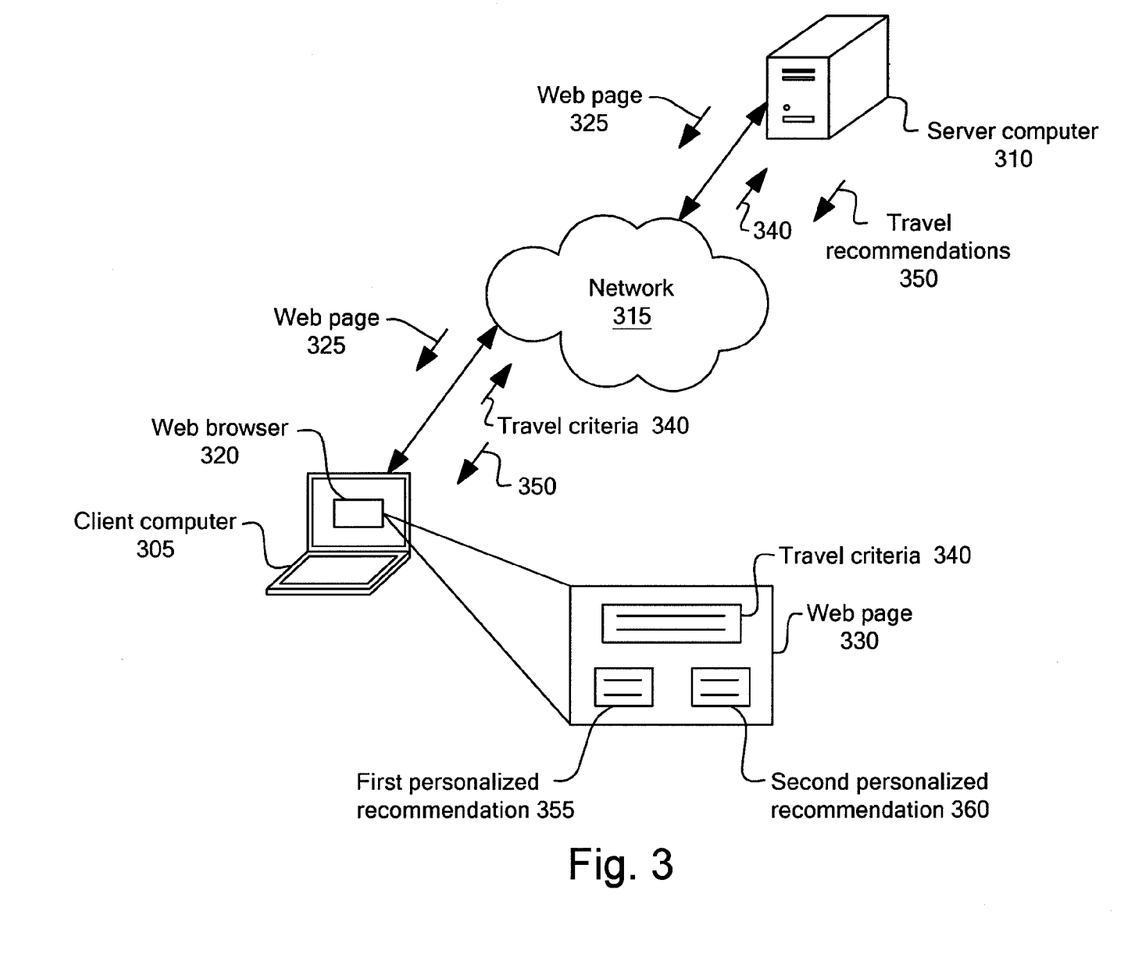
FIG. 3 is a block diagram illustrating a server computer in communication with a client computer over a network in accordance with an embodiment of the present disclosure.

FIG. 3 is a block diagram of an embodiment of a client computer 305 (also referred to as a client device 305) communicating with a server computer 310 over a network 315 such as the Internet. A user uses a web browser 320 on the client computer 305 to access the Internet. In one embodiment, server computer 310 transmits a web page 325 via the network 315 to the client computer 305 for display by the web browser 320 in a web page 330.

For purposes of this disclosure, a computer such as the client computer 305 includes a processor and memory for storing and executing program code, data and software. Computers can be provided with operating systems that allow the execution of software applications in order to manipulate data. Client computer 305 can be any device that can display a website and that can be used by a user. Personal computers, servers, personal digital assistants (PDAs), wireless devices, smartphones, cellular telephones, tablet computers, internet appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Washington, or the Ubuntu operating system distributed by Canonical Ltd. of Douglas, Isle of Man. In one embodiment, the server computer 310 is a group of servers (e.g., a server farm).

In one embodiment, the user of the client device 305 logs into the web page 330. The user submits travel criteria 340 in the web page 330, such as the dates and times of flights that the user would like to be on, a hotel that the user would like to stay at, price range that the user would like to pay for the flight or hotel, and/or any other travel criteria associated with a user's trip. In one embodiment, the client device 305 transmits this user travel criteria 340 to the server computer 310. As described in more detail below, the server computer 310 analyzes the user travel criteria 340 in light of data received from multiple sources (e.g., user reviews, past transaction history of the user on the site, data from other sites about a particular traveling service, etc.) to determine one or more personalized recommendations for the user. The server computer 310 transmits the travel recommendations 350 to the client device 305. The client device 305 displays the personalized travel recommendations 350 to the user, such as a first personalized recommendation 355 and a second personalized recommendation 360.

Although described as the server computer 310 performing the processing, in another embodiment the client computer 305 performs some or all of the processing to determine the personalized travel recommendations 350 to the user. Further, although the description below uses a flight as the travel, any type of travel service can be used in the system, such as hotel reservations and/or hotel amenities.

Figure 4:
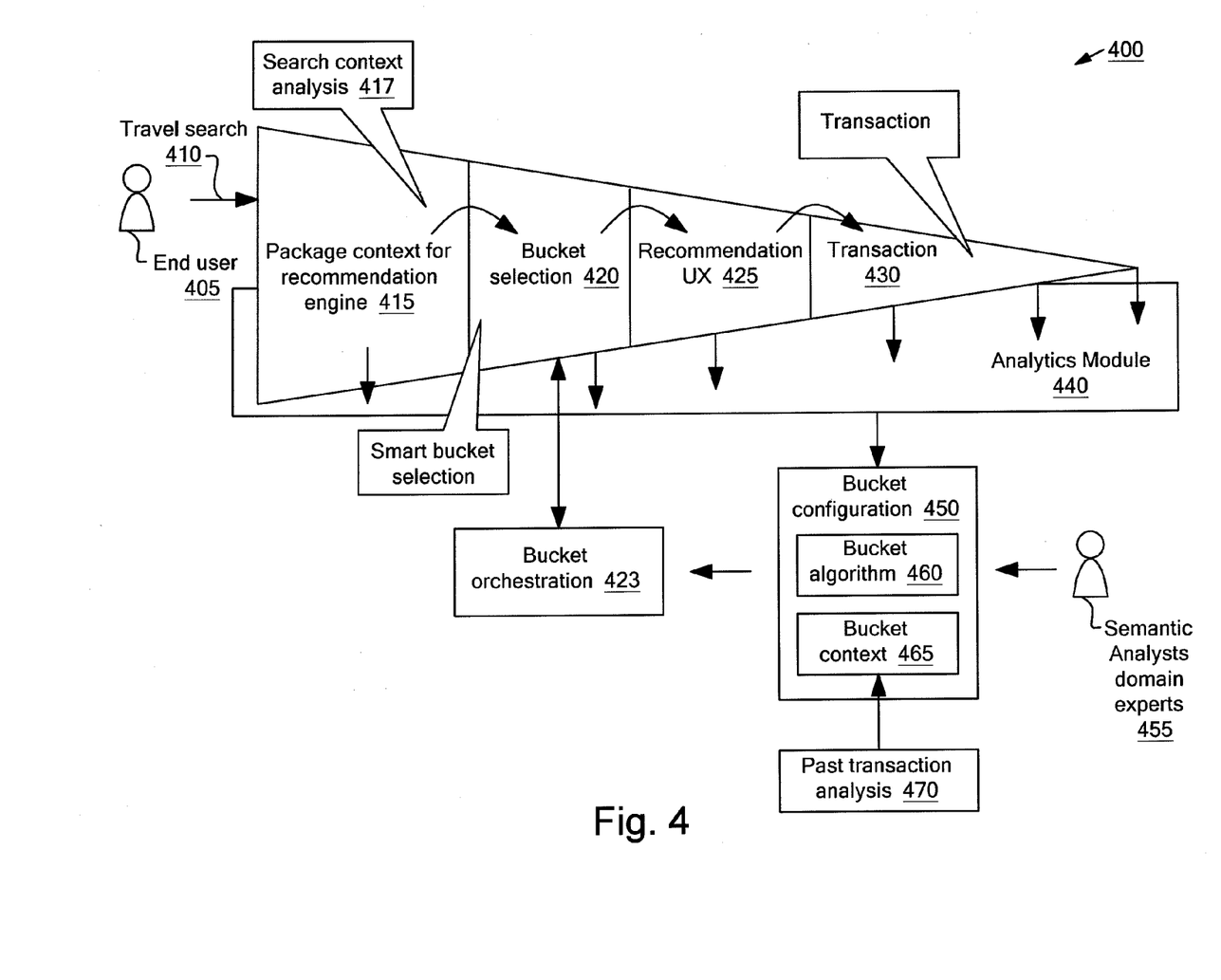
FIG. 4 is a system architecture to provide personalized recommendations to a user in accordance with an embodiment of the present disclosure.

FIG. 4 shows an embodiment of a system architecture 400 to provide personalized recommendations to a user. In one embodiment, the client computer 305 performs the processing shown in FIG. 4. In another embodiment, the server computer 310 performs the processing shown in FIG. 4. In yet another embodiment, the client computer 305 performs some of the processing shown in FIG. 4 and the server computer 310 performs some of the processing shown in FIG. 4.

A user 405 submits a travel search 410 to the web page 330. The system 400 receives the travel search 410 and determines a package context 415 for the travel search. The system 400 performs search context analysis 417 to determine the package context 415. As described in more detail below, the package context 415 can include, for example, a combination of the user's query, user's past transaction history, his personal preferences and/or any other relevant environmental context. Next, a bucket selection 420 occurs to determine which specific buckets to include in the recommendation for the user. In one embodiment, the bucket selection 420 communicates with a bucket orchestration module 423. The bucket orchestration module 423 is used to perform the bucket selection 420. The data is then transmitted to the recommendation user experience (UX) module 425. A transaction 430 is then generated. The package context 415, bucket selection 420, recommendation user experience module 425 data, and transaction data is transmitted to an analytics module 440 for analysis.

The data from the analytics module 440 is transmitted to a bucket configuration module 450. The bucket configuration module 450 receives input from semantic analysts and/or domain experts 455 to determine a bucket algorithm 460 and a bucket context 465. The bucket orchestration module 423 is configured or trained via the adjusting of the bucket configuration 450. The semantic analysts and/or domain experts 455 can be one or more people or one or more machines. In one embodiment, the bucket configuration module 450 receives past transaction analysis 470. In one embodiment, the bucket configuration 450 is based on past transaction analysis 470 and the analytics of the data recording operations 415, 420, 425, and 430 (current operations as a feedback to the system to fine tune the bucket configuration for future "bucketing".

A bucket/recommendation is a predefined characterization of travel options (e.g., "best for productivity", "company value", "cheapest", "fastest", etc.). Instead of presenting the list of travel options to the user to ask the user to understand the value trade-off among different travel attributes of a travel option (e.g., a flight), the system 400 analyzes the trade-off and assigns the travel options to buckets, each having a name (e.g., "best for productivity") that indicates the value trade-off made in the bucket. For example, if the user is interested in "best for productivity", in one embodiment there is no need to look at the travel options placed in other buckets. Each bucket may be presented with certain characteristics of the options in the respective buckets, such as the lowest price of the options in the bucket. Each bucket may have only one top option, representing the recommended option for the optimization goal suggested by the name of the respective bucket. The server may classify all search results into the buckets, or only the top candidates for each of the buckets (and thus filtering out other results).

To seed the system 400, in one embodiment a set of domain experts and/or semantic analysts 455 define a set of buckets. Each bucket is modeled as a function over a set of travel attributes (e.g., price of flight, duration of flight, stopcount, inflightwifi, aircraft type, user loyalty information, comfort information). In one embodiment, attributes take different weights depending on, for example, the bucket being defined and/or the user for whom the bucket is being defined for. In one embodiment, the attribute weighting is defined by performing a rigorous analysis of past transaction data (e.g., stored in a database in communication with the server computer 310). Once again, to seed the system, domain experts and/or semantic analysis influence the weighting. Eventually, new transaction data as well as user engagement data is used to train the system.

For example, the price of a flight attribute for a flight may be more heavily weighted than the comfort information of a flight for a user who has selected the cheapest flight option in the past and has never selected the comfort option. Thus, in one embodiment a feedback loop exists—data associated with a trip from multiple sources is analyzed, and this data includes user preferences and past actions. This data is then used to provide future recommendations to the user.

In one embodiment, the process of defining and refining a bucket is a continuous one. The system 400 is an experimentation platform that enables the defining of buckets on the fly and enables the buckets to be surfaced to a select set of users by running an experiment. In one embodiment, the results of the experiment determine the future viability and/or the design of the bucket. Buckets that are defined get added to a pool of available buckets which are available to be offered to the user.

In one embodiment, each bucket corresponds to a model or function that generates a score (e.g., a score for "best for productivity") for each travel option, based on flight/travel attributes of each travel option and/or the user preferences, context, history, etc. The score/model/function implemented in the bucket orchestration module ranks the travel options for classification into different buckets.

In more detail, when a user performs a travel query (e.g., submits a travel search 410/travel criteria 340), in one embodiment user context (a combination of the user's query, user's past transaction history, his personal preferences and/or any other relevant environmental context) is packaged by the package context module 415. A bucket selection 420 occurs and is offered (e.g., transmitted) to bucket orchestration module 423. The bucket orchestration module 423 uses the context to decide the subset of buckets as well as the order of buckets that should be surfaced (presented) to the user. In one embodiment, to seed the system, a uniform set of buckets is used that are surfaced to all the users. As the system 400 gains experience/confidence, the orchestration module 423 gets more aggressive in making these determinations.

Figure 5:
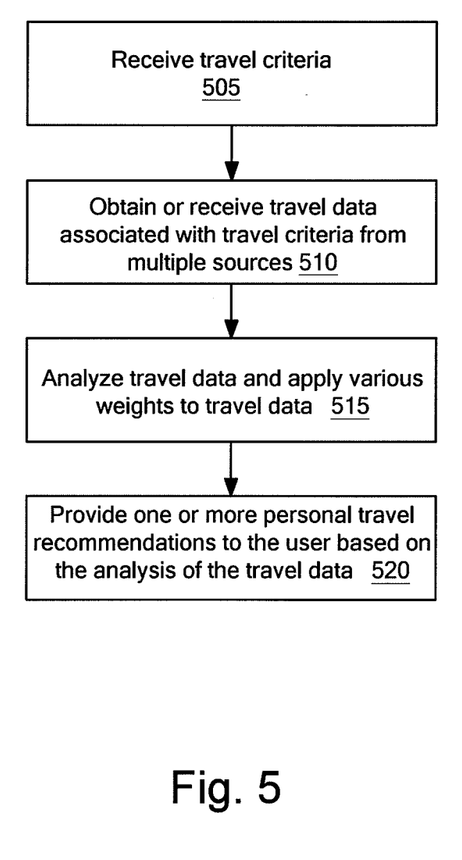
FIG. 5 is a flowchart illustrating operations performed by the server computer to provide recommendations to a user in accordance with an embodiment of the present disclosure.

The system 400 then renders the appropriate set of buckets to the user 405. In one embodiment, the buckets are presented to the user 405 in increasing order of decision making complexity. For example and as shown in FIG. 5, the cheapest bucket 505 is shown before the fastest bucket 510. This allows the user 405 to immediately understand the premium that he is paying for flying faster. Thus, users can not only abstract away complexities behind these buckets but also can determine the tradeoff between one bucket and another bucket. Furthermore, in one embodiment the system 400 is highly transparent in how the recommendations are made by explaining to the user the dominant attributes that constitute a single bucket.

A user may interact with the bucket by voting up or down attributes that have been identified as dominant attributes for a particular bucket. By allowing the user 405 to participate in the bucket definition process, the bucket definition will be trained towards the "correct" weights faster than without user participation. This recommendation system 400 is further strengthened by analytics module 440 that collects engagement & transaction data at every stage of the transaction funnel (operations 415, 420, 425, and 430) and uses that analytics data to influence bucket orchestration and/or the design of the bucket itself.

In one embodiment, a bucket can be defined (e.g., by the user 405) that captures a sub-goal in travel solution selection. A bucket can also be defined as a function of one or more attributes, based on analysis of past transactions (e.g., regression analysis), based on semantic knowledge, and/or based on analytical data and user behavior (e.g., on the site and/or on other sites). In one embodiment, analytics influence the fine-tuning of bucket attribute weights. In one embodiment, the experimentation platform enables the system to determine the correct set of buckets for a specific user.

The buckets can be personalized to a user's company policy, personalized to a user's specific preferences, personalized to a user's past and present search behavior, and/or personalized to a user's frequent flyer account standing. As stated above, the bucket definitions are transparent and may be fine tuned by the user or a company for a set of users. In one embodiment, a company (or user) can define a custom narrative for each bucket option, can define what buckets are viewed based on a set of bucket options, and/or can define the order of buckets that are viewed.

FIG. 5 is a flowchart showing an embodiment of the operations performed to provide these recommendations. The server computer 310 (or client computer 305) receives travel criteria 340 (e.g., from the client computer 305) (Operation 505). The server computer 310 then retrieves or obtains travel data associated with the travel criteria from multiple sources (e.g., from the web, from a database, from other computers, from memory, etc.) (Operation 510). The data can be retrieved or obtained by the server computer 310 continuously, periodically, at various times, etc. The server computer 310 analyzes the travel data and, in one embodiment, applies various weights to the travel data (Operation 515). As stated above, the analysis of the travel data can include adjusting one or more weights based on the user's past interaction(s) with the web site. In one embodiment, the user 405 can tailor the analysis by specifying or adjusting particular weights that the user wants applied to different travel data. The server computer 310 then provides one or more personal travel recommendations to the user based on the analysis of the travel data (Operation 520).

In one embodiment, the analysis of the travel data includes analyzing data associated with and/or recommendations provided to the user's social networking connections. For example, suppose the user 405 is connected to person B on a social networking site such as Facebook® or LinkedIn®. In one embodiment, the server computer 310 determines that person B is connected to user 405 via a social networking site and person B has always selected flights on a specific airline. In one embodiment, the server computer 310 utilizes this information in its personalized recommendation to the user 405. For example, the personalized recommendation can indicate that user 405's friend person B has previously selected flights on the particular airline. A recommendation associated with a user's "friend" or social connection may be beneficial to the user 405 (e.g., may provide more weight to the recommendation). Thus, in one embodiment, the personalized recommendations provided by the server computer 310 are tailored based on recommendations provided to or selections made by the user's social connections on a social networking site.

In one embodiment, the web site displaying the personalized recommendations include advertisements. In one embodiment, the advertisements are related to the personalized recommendations. The advertisements may be provided by the server computer 310 and/or by a third party advertisement server.

Figure 6:
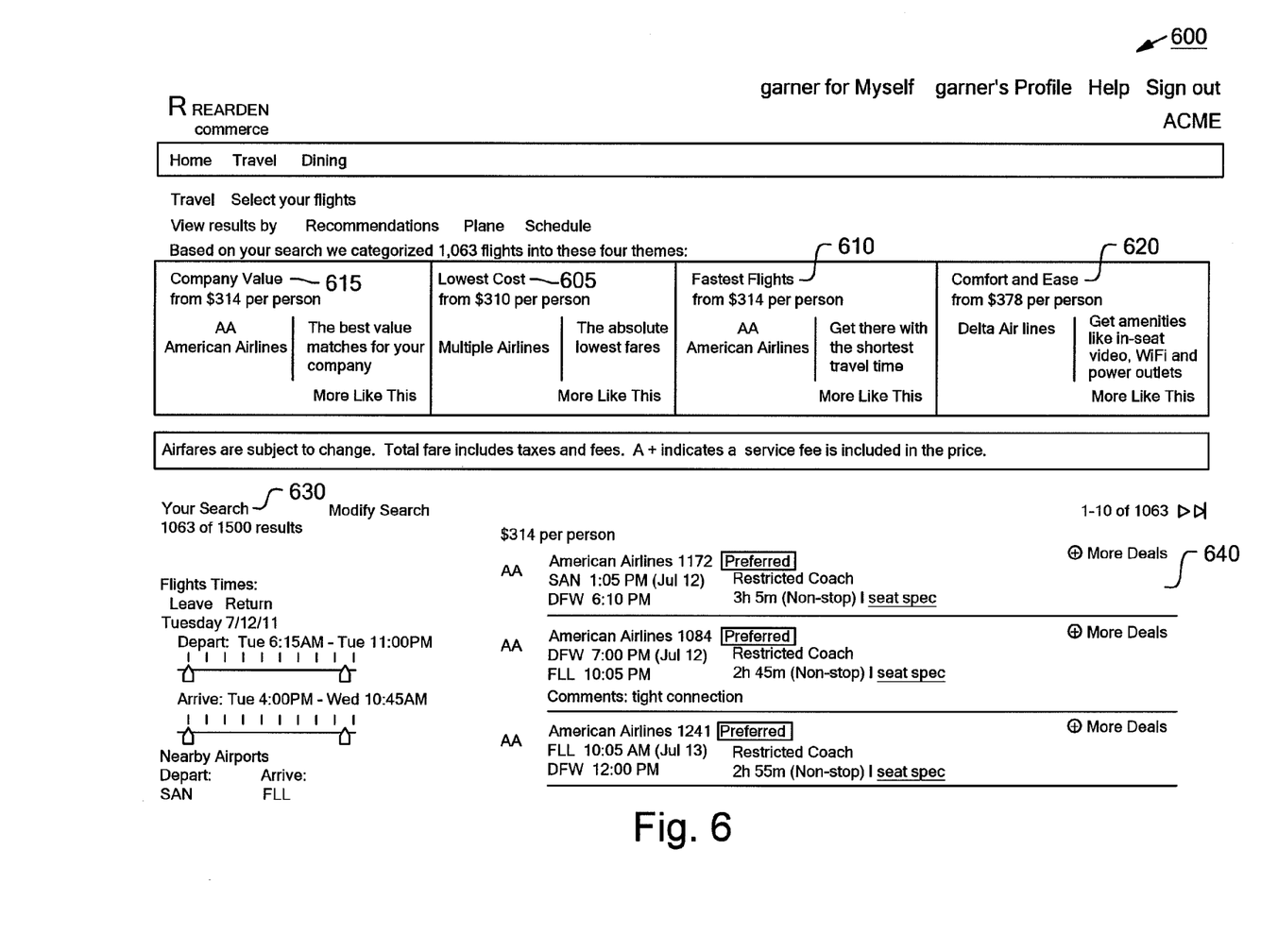
FIG. 6 is a user interface provided by the server computer that displays personalized recommendations to a user in accordance with an embodiment of the present disclosure.

FIG. 6 is an embodiment of a user interface 600 showing personalized recommendations for user 405. In one embodiment, the buckets selected and displayed include company value 615, lowest cost 605, fastest flights 610, and comfort and ease 620. If, for example, the user 405 never selects the comfort and ease recommendation 620, in one embodiment the system will adjust based on the user's past transactions and not provide this recommendation in the future. In one embodiment, the user interface 600 includes a summary 630 of your travel criteria and/or additional information 640 associated with an option. The buckets/recommendations can include, for example, company value, best value, best for loyalty, best for productivity, fastest flights, lowest cost, comfort and ease (e.g., reclining seats, most space, most leg room, etc.), best technology (e.g., video screens available for each seat), best fitness center (in a hotel), best service, best meals, availability of wifi, availability of restaurants nearby, most entertainment available (e.g., shows playing near hotel), best facilities (e.g., swimming pool in hotel), etc. In one embodiment, the buckets presented as recommendations are based on a user profile for the user 405. This user profile can be created by the user (e.g., when creating an account, at login, etc.) or can be determined based on previous user interactions with the web site.

Figure 7:
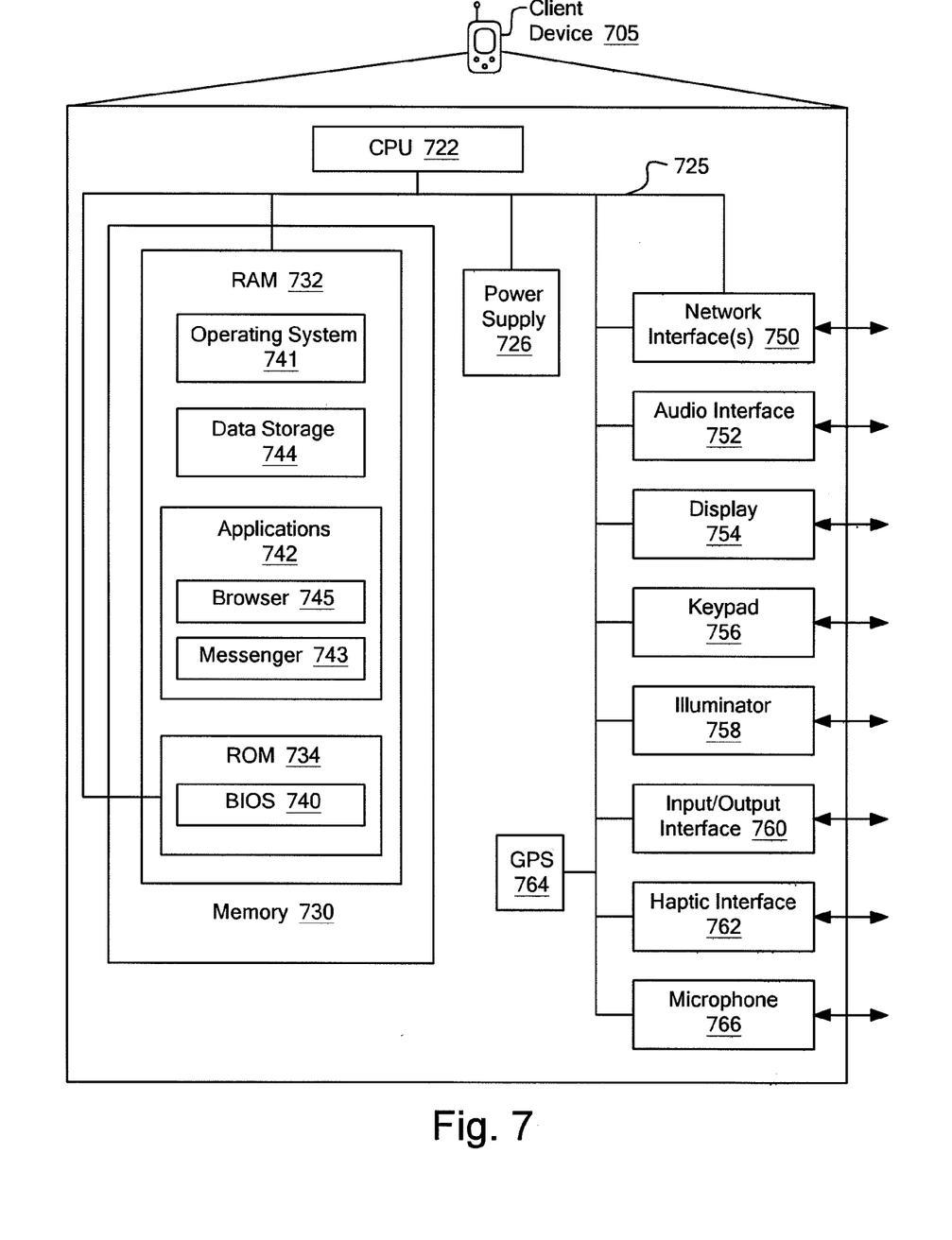
FIG. 7 is a schematic diagram illustrating a client device in accordance with an embodiment of the present disclosure.

FIG. 7 shows one example of a schematic diagram illustrating a client device 705 (e.g., client device 305). Client device 705 may include a computing device capable of sending or receiving signals, such as via a wired or wireless network. A client device 705 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 705 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 705 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 7, client device 705 may include one or more processing units (also referred to herein as CPUs) 722, which interface with at least one computer bus 725. A memory 730 can be persistent storage and interfaces with the computer bus 725. The memory 730 includes RAM 732 and ROM 734. ROM 734 includes a BIOS 740. Memory 730 interfaces with computer bus 725 so as to provide information stored in memory 730 to CPU 722 during execution of software programs such as an operating system 741, application programs 742, device drivers, and software modules 743, 745 that comprise program code, and/or computer-executable process operations, incorporating functionality described herein, e.g., one or more of process flows described herein. CPU 722 first loads computer-executable process operations from storage, e.g., memory 732, data storage medium/media 744, removable media drive, and/or other storage device. CPU 722 can then execute the stored process operations in order to execute the loaded computer-executable process operations. Stored data, e.g., data stored by a storage device, can be accessed by CPU 722 during the execution of computer-executable process operations.

Persistent storage medium/media 744 is a computer readable storage medium(s) that can be used to store software and data, e.g., an operating system and one or more application programs. Persistent storage medium/media 744 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 705 can also include one or more of a power supply 726, network interface 750, audio interface 752, a display 754 (e.g., a monitor or screen), keypad 756, illuminator 758, I/O interface 760, a haptic interface 762, a GPS 764, and/or a microphone 766.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 8:
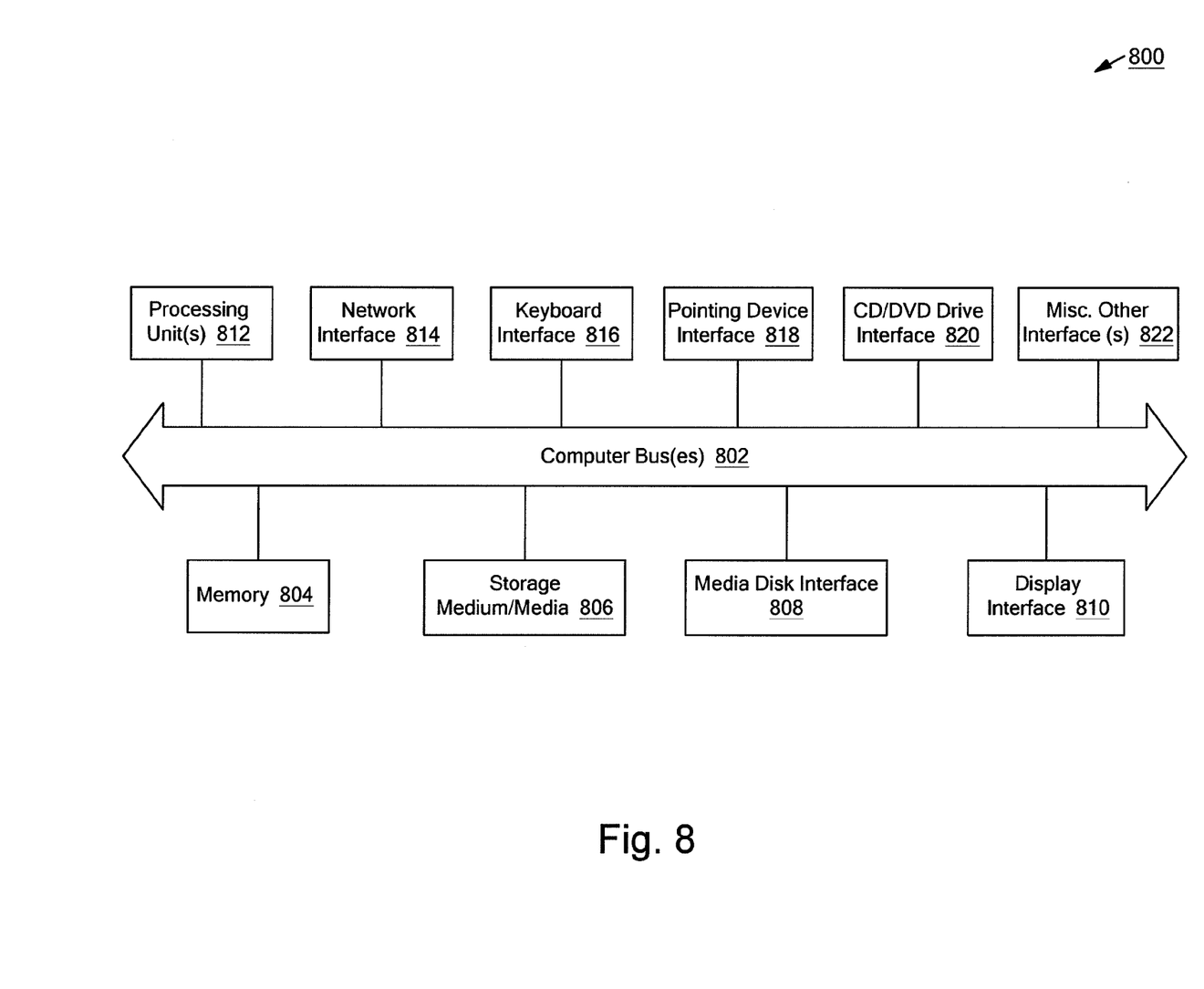
FIG. 8 is a block diagram of an internal architecture of a computing device in accordance with an embodiment of the present disclosure.

FIG. 8 is a block diagram illustrating an internal architecture of an example of a computer, such as server computer 110 and/or client computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 8, internal architecture 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process operations, incorporating functionality described herein, e.g., one or more of process flows described herein. CPU 812 first loads computer-executable process operations from storage, e.g., memory 804, storage medium/media 806, removable media drive, and/or other storage device. CPU 812 can then execute the stored process operations in order to execute the loaded computer-executable process operations. Stored data, e.g., data stored by a storage device, can be accessed by CPU 812 during the execution of computer-executable process operations.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, playlists and other files. Persistent storage medium/media 806 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a server computer from a client device operated by a user, a travel request;
   identifying, by the server computer, travel options according to the travel request;
   ranking, by the server computer, each travel option in the identified travel options, the ranking based on travel attributes of each travel option and user preferences;
   training, by the server computer, a bucket configuration module to determine a bucket algorithm and a bucket context for grouping travel options, one or more of the bucket algorithm and the bucket context based on input from domain experts, input from semantic analysts, analytics data, user preferences, company policies, and past transaction analysis;
   classifying, by a bucket orchestration module of the server computer from the bucket algorithm and the bucket context, the ranked travel options into predefined buckets, the classifying further comprising defining, by the server computer, the buckets, the defining of the buckets personalized for the user;
   filtering, by the server computer, the ranked travel options in the predefined buckets;
   communicating, by the server computer to the client device, the filtered classified ranked travel options in the corresponding predefined buckets for display, the filtered classified ranked travel options in the corresponding predefined buckets displayed at the client device in an order associated with the user, the order enabling the user to determine a tradeoff between one bucket and another bucket;
   receiving, by the server computer from the client device, interactions from the user with one or more of the displayed predefined buckets, the interactions comprising a voting of the travel options in the bucket; and
   in response to receiving the interactions from the user with the one or more of the displayed predefined buckets, using, by the bucket configuration module, the interactions in the bucket algorithm for future classifying.

2. The method of claim 1, wherein the communicating of the options is personalized for the user.

3. The method of claim 1, wherein the classifying of the travel options into the predefined buckets further comprises defining, by the user, a function to classify an option.

4. The method of claim 3, wherein the defining, by the user, of the function further comprises defining the function via one or more votes.

5. The method of claim 1, further comprising classifying a first bucket, the classifying based on a model function of the first bucket.

6. The method of claim 5, wherein the classifying of the first bucket is further based on attributes associated with the travel options.

7. The method of claim 1, further comprising determining, by the server computer, a plurality of buckets specifically for the user.

8. The method of claim 7, further comprising providing, by the server computer to the client device, the plurality of buckets as recommendations for the user based on the travel request.

9. The method of claim 7, wherein the determining of the plurality of buckets further comprises determining buckets that are one or more of personalized to a user's search behavior and personalized based on social connections.

10. A system comprising:
    a processor; and
    memory storing instructions configured to instruct the processor to:
      receive, from a client device operated by a user, a travel request;
      identify travel options according to the travel request;
      rank each travel option in the identified travel options, the ranking based on travel attributes of each travel option and user preferences;
      train a bucket configuration module to determine a bucket algorithm and a bucket context for grouping travel options, one or more of the bucket algorithm and the bucket context based on input from domain experts, input from semantic analysts, analytics data, user preferences, company policies, and past transaction analysis;
      classify, from the bucket algorithm and the bucket context, the ranked travel options into predefined buckets the instructions configured to instruct the processor to classify further comprises instructions to define the buckets, the instructions to define the buckets further comprise instructions that are personalized for the user;

filter the ranked travel options in the predefined buckets;

communicate, to a client device for display, the filtered classified ranked travel options in the corresponding predefined buckets, the filtered classified ranked travel options in the corresponding predefined buckets displayed at the client device in an order associated with the user, the order enabling the user to determine a tradeoff between one bucket and another bucket;

receive, from the client device, interactions from the user with one or more of the displayed predefined buckets, the interactions comprising a voting of the travel options in the bucket; and in response to receiving the interactions from the user with the one or more of the displayed predefined buckets, use, by the bucket configuration module, the interactions in the bucket algorithm for future classifying.

11. The system of claim 10, wherein the instructions to communicate the options further comprises instructions to communicate that are personalized for the user.

12. The system of claim 10, wherein the instructions to classify the travel options into the predefined buckets further comprises instructions to enable the user to define a function to classify an option.

13. The system of claim 12, wherein the instructions to enable the user to define the function further comprises instructions to enable the user to define the function via one or more votes.

14. The system of claim 10, further comprising instructions to classify a first bucket, the instructions based on a model function of the first bucket.

15. The system of claim 14, wherein the instructions to classify the first bucket is further based on attributes associated with the travel options.

16. The system of claim 10, further comprising instructions to determine a plurality of buckets specifically for the user.

17. The system of claim 16, further comprising instructions to provide, to the client device, the plurality of buckets as recommendations for the user based on the travel request.

18. The system of claim 16, wherein the instructions to determine the plurality of buckets further comprises instructions to determine buckets that are one or more of personalized to a user's search behavior and personalized based on social connections.

19. A non-transitory computer readable storage medium storing computer program instructions configured to instruct a computer processor to at least:

receive, from a client device operated by a user, a travel request;

identify travel options according to the travel request;

rank each travel option in the identified travel options, the ranking based on travel attributes of each travel option and user preferences;

train a bucket configuration module to determine a bucket algorithm and a bucket context for grouping travel options, one or more of the bucket algorithm and the bucket context based on input from domain experts, input from semantic analysts, analytics data, user preferences, company policies, and past transaction analysis;

classify, by a bucket orchestration module from the bucket algorithm and the bucket context, the ranked travel options into predefined buckets, the computer program instructions configured to instruct a computer processor to classify further comprises instructions to define the buckets, the instructions to define the buckets further comprise instructions that are personalized for the user;

filter the ranked travel options in the predefined buckets;

communicate, to a client device for display, the filtered classified ranked travel options in the corresponding predefined buckets, the filtered classified ranked travel options in the corresponding predefined buckets displayed at the client device in an order associated with the user, the order enabling the user to determine a tradeoff between one bucket and another bucket;

receive, from the client device, interactions from the user with one or more of the displayed predefined buckets, the interactions comprising a voting of the travel options in the bucket; and in response to receiving the interactions from the user with the one or more of the displayed predefined buckets, use, by the bucket configuration module, the interactions in the bucket algorithm for future classifying.

* * * * *